US006637418B1

(12) United States Patent
Suba et al.

(10) Patent No.: US 6,637,418 B1
(45) Date of Patent: Oct. 28, 2003

(54) KIT FOR CONVERTING CONVENTIONAL, SPRING-ACTUATED PITCHING MACHINE INTO A VIDEO PITCHING MACHINE

(76) Inventors: Michael T. Suba, 20 Poe Ct., Fairfield, CT (US) 06432; Michael DeVasto, 11 Highwood Pl., Trumbull, CT (US) 06611; Timothy O'Reilly, 25 Palmer St., Oxford, CT (US) 06478; Gregory J. Battersby, 25 Poplar Plain Rd., Westport, CT (US) 06880

( * ) Notice: Subject to any disclaimer, the term of this patent is extended or adjusted under 35 U.S.C. 154(b) by 0 days.

(21) Appl. No.: 10/188,119

(22) Filed: Jul. 2, 2002

(51) Int. Cl.$^7$ .................................................. F41B 3/03
(52) U.S. Cl. ................................ 124/6; 124/34; 124/36
(58) Field of Search .............................. 124/6, 32, 34, 124/36, 49, 50, 51.1

(56) References Cited

U.S. PATENT DOCUMENTS 5,195,744 A * 3/1993 Kapp et al.
5,344,137 A * 9/1994 Komori
5,359,986 A * 11/1994 Magrath et al.
6,305,366 B1 * 10/2001 Rizzo et al.

* cited by examiner

*Primary Examiner*—John A. Ricci
(74) *Attorney, Agent, or Firm*—Grimes & Battersby, LLP

(57) ABSTRACT

The present invention consists of a conversion kit for converting a spring-actuated pitching machine of the Iron Mike type to a video pitching machine, i.e., a pitching machine that includes a video projection screen on which the video image of an actual pitcher is displayed in synchronization with the release of a ball from the pitching machine. The kit includes a projection screen; a projector; a clutch motor unit; a relay unit; and a control unit. The projection screen, which is adapted to be positioned between the pitching machine and a batter, includes an aperture through which a ball may be delivered to the batter by the conventional spring-actuated pitching machine. The video projector must be able to project the video image of an actual pitcher onto the projection screen. The clutch motor is adapted to hold a ball in a queued position within the spring-actuated pitching machine and, upon release, propel the ball toward the batter in synchronization with the video image. A control unit is provided for storing the video image and displaying the video image onto the screen as well as for causing the clutch motor to hold the ball in a queued position and, upon release, propel the ball toward the batter in full synchronization with the video image displayed on the screen.

12 Claims, 5 Drawing Sheets

KIT FOR CONVERTING CONVENTIONAL, SPRING-ACTUATED PITCHING MACHINE INTO A VIDEO PITCHING MACHINE

FIELD OF THE INVENTION

The present invention relates generally to a kit for converting a conventional spring-actuated pitching machine into a video pitching machine and, more particularly, to such a kit that can be used in combination with such as machine as the Iron Mike spring-actuated baseball and softball pitching machine marketed by Master Pitching Machine, Inc.

DESCRIPTION OF THE PRIOR ART

Pitching machines and ball-throwing machines are well-known in the art and generally fall into four categories: (1) machines that employ a spring-actuated arm mechanism to propel the ball; (2) machines that employ at least one rotating wheel or a pair of rotating, coasting wheels to propel the ball; (3) machines that rely on pneumatic pressure to propel the ball; and (4) machines that employ converging and diverging rotatable discs to propel the ball.

Perhaps the most common spring-actuated machine is the Iron Mike pitching machine marketed by Master Pitching Machine, Inc. of Kansas City, Mo. The Iron Mike machine comes in both a baseball and a softball version. In a commercial environment, these spring-actuated pitching machines are typically installed in individual batting cages, frequently with ball retrieval systems and are mounted at one end of the cage with the hitter at the opposite end. The advantage that a spring-actuated pitching machine has over conventional wheeled machines is that the movement of the spring-actuated arm gives the hitter some warning that a ball is about to be delivered and assists him or her with timing. In some installations, a light may be provided above the machine to indicate that a ball is about to be delivered.

On the training side, the use of such machines is frequently a problem for serious players since the success of most players at higher levels (and faster pitching speeds) is an ability to properly time a pitch. Obviously, timing a spring-actuated arm is vastly different from timing the windup and release of an actual pitcher in game-like conditions. This timing difference is one reason why some coaches discourage their hitters from working in batting cages during the season.

The incorporation of a video display in combination with such conventional wheeled pitching machines has been known for quite some time. See, for example, U.S. Pat. No. 5,195,744 which issued on Mar. 23, 1993 to Neil S. Kapp et al. for Baseball Batting Practice Apparatus with Control Means where a ball is introduced into a conventional pitching machine by a gravity drop which is timed in synchronization with a video display. The synchronization means of such device relies upon an audio signal generated by the video, without any regard to the status of the ball in the queued position. Furthermore, the ball queuing system of this device relies on gravity and is imprecise and subject to failure.

ProBatter Sports, LLC of Milford, Conn. markets its "Professional" line of video pitching simulators which employ substantially more complex video control systems in conjunction with a multi-pitch pitching machine. The Pro-Batter systems are described in greater detail in U.S. Pat. Nos. 6,182,649 which issued on Feb. 6, 2001 in the name of Gregory J. Battersby et al. for a Ball-Throwing Machine; U.S. Pat. No. 6,186,133 which issued on Feb. 13, 2001 in the name of Gregory J. Battersby et al. for System and Method for Establishing Pitch Parameters in a Ball-Throwing Machine; and U.S. Pat. No. 6,186,134 which issued on Feb. 13, 2001 in the name of Gregory J. Battersby et al. for Pitching System with Video Display Means, the disclosures of which are all incorporated herein by reference thereto.

Chin Music, LLC of Seattle, Wash. has also developed a computerized pitching machine which is marketed by Fastball Development Inc. for a product called "Abner." This technology is described more fully in U.S. Pat. No. 6,082,350 which issued on Jul. 4, 2000 for Accurate, Multi-Axis, Computer Controlled Object Projection Machine. Master Pitching Machine recently began marketing a product called the LED Pitcher which is an LED display system of a simulated pitcher which they mount in advance of their machine. The machine utilizes two cams on the machine, the first to turn on the LED Pitcher and the second to count pitches and mark the stop position. The LED screen is mounted adjacent to the release point of the Iron Mike machine so that the ball comes off the side of the screen. As such, portions of the arm of the LED pitcher are lost as the arm gets closer to the release point. In addition, the LED image is vastly different from a video image in that motion is in stepped phases as opposed to the fluid motion of a video image. Finally, as a result of the LED makeup, it is impossible to change pitcher images as is the case with a video image where interchangeable video images can be used interchangeably.

None of these systems specifically-address the creation of a video conversion kit for an existing spring-actuated pitching machine to add a video display component.

SUMMARY OF THE INVENTION

Against the foregoing background, it is a primary object of the present invention to provide a kit for converting a conventional, spring-actuated, pitching machine into a video pitching machine.

It is another object of the present invention to provide such a kit which can be used for both baseball and softball spring-actuated pitching machine.

It is yet another object of the present invention to provide such a kit which can be used in conjunction with a combined baseball and softball spring-actuated pitching machine which share a common control box and projection system.

It is still another object of the present invention to provide such a kit which permits precise introduction of the ball into the pitching machine.

To the accomplishments of the foregoing objects and advantages, the present invention, in brief summary, comprises a conversion kit for converting a spring-actuated pitching machine of the Iron Mike type to a video pitching machine, i.e., a pitching machine that includes a video projection screen on which the video image of an actual pitcher is displayed in synchronization with the release of a ball from the pitching machine. The kit includes a projection screen; a projector; a motor unit including a clutch brake; a relay unit; and a control unit. The projection screen, which is adapted to be positioned between the pitching machine and a batter, includes an aperture through which a ball may be delivered to the batter by the conventional spring-actuated pitching machine. The video projector must be able to project the video image of an actual pitcher onto the projection screen. The motor unit with the clutch brake is adapted to hold a ball in a queued position within the spring-actuated pitching machine and, upon release, propel the ball toward the batter in synchronization with the video image. A control unit provided for storing the video image and displaying the video image onto the screen as well as for causing the motor unit with the clutch brake to hold the ball in a queued position and, upon release, propel the ball toward the batter in full synchronization with the video image displayed on the screen.

BRIEF DESCRIPTION OF THE DRAWINGS

The foregoing and still other objects and advantages of the present invention will be more apparent from the detailed explanation of the preferred embodiments of the invention in connection with the accompanying drawings, wherein.

DESCRIPTION OF THE PREFERRED EMBODIMENTS

The present invention comprises a conversion kit that can be used in conjunction with a conventional spring-actuated pitching machine, preferably the Iron Mike pitching machine marketed by Master Pitching Machine, Inc. of Kansas City, Mo. to covert such conventional spring-actuated pitching machine into a video pitching machine, i.e., a pitching machine that includes a video component having a projection screen mounted between the pitching machine and a batter on which a video of an actual pitcher is displayed in synchronization with the actual release of a pitch by the pitching machine. It will be appreciated that the conversion kit of the present invention can be used in conjunction with virtually any spring-actuated pitching machine.

Figure 1:
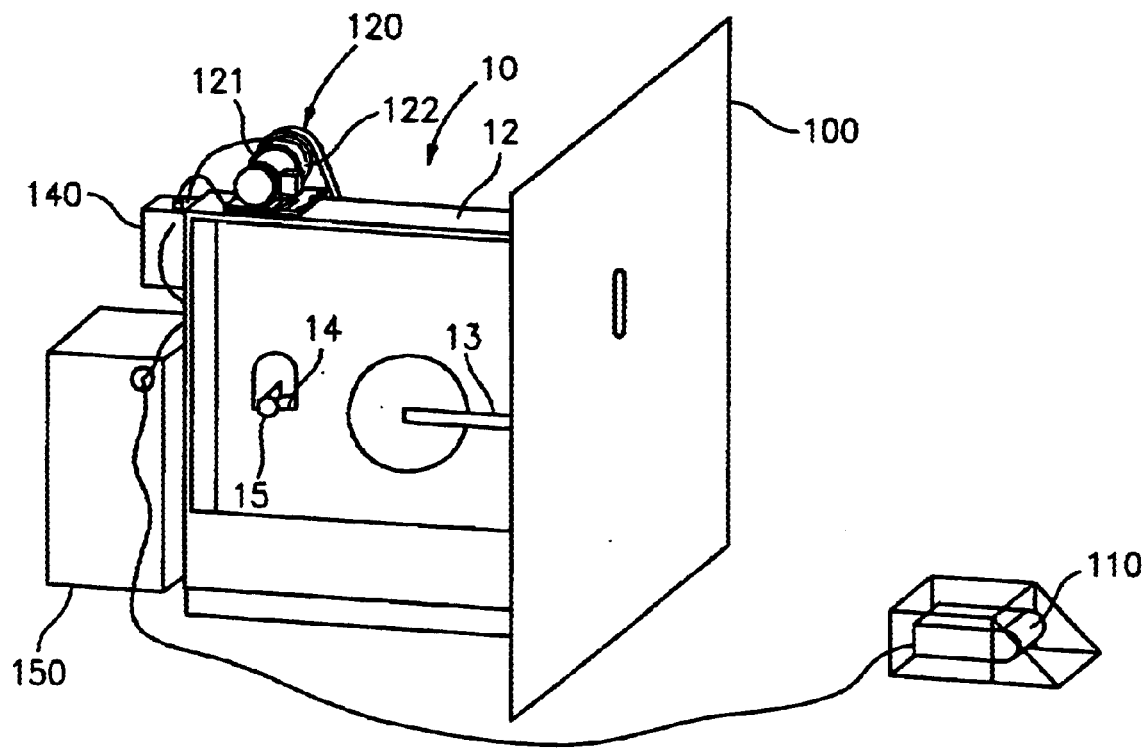
FIG. 1 is a perspective illustration of the conversion kit of the present invention mounted in conjunction with a spring-actuated pitching machine.
Figure 3:
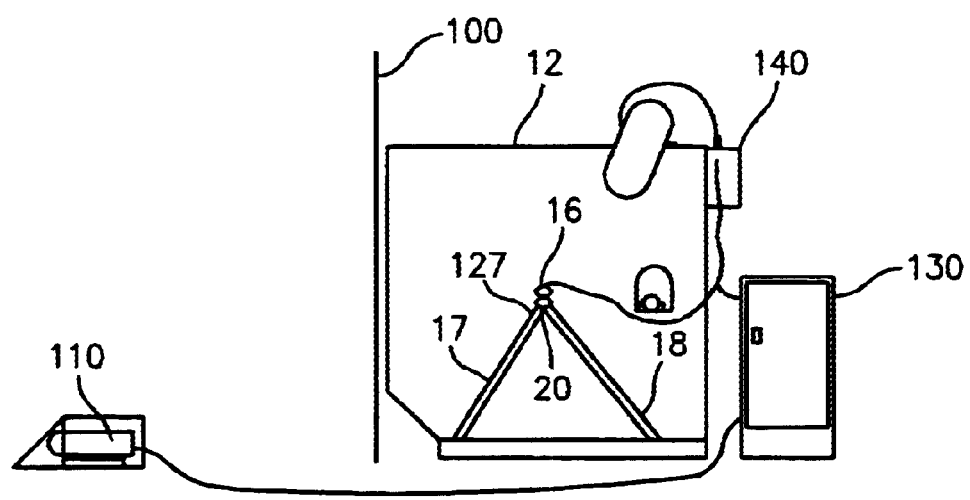
FIG. 3 is a side view of the spring-actuated pitching machine of FIG. 1 including the conversion kit of the present invention.
Figure 2:
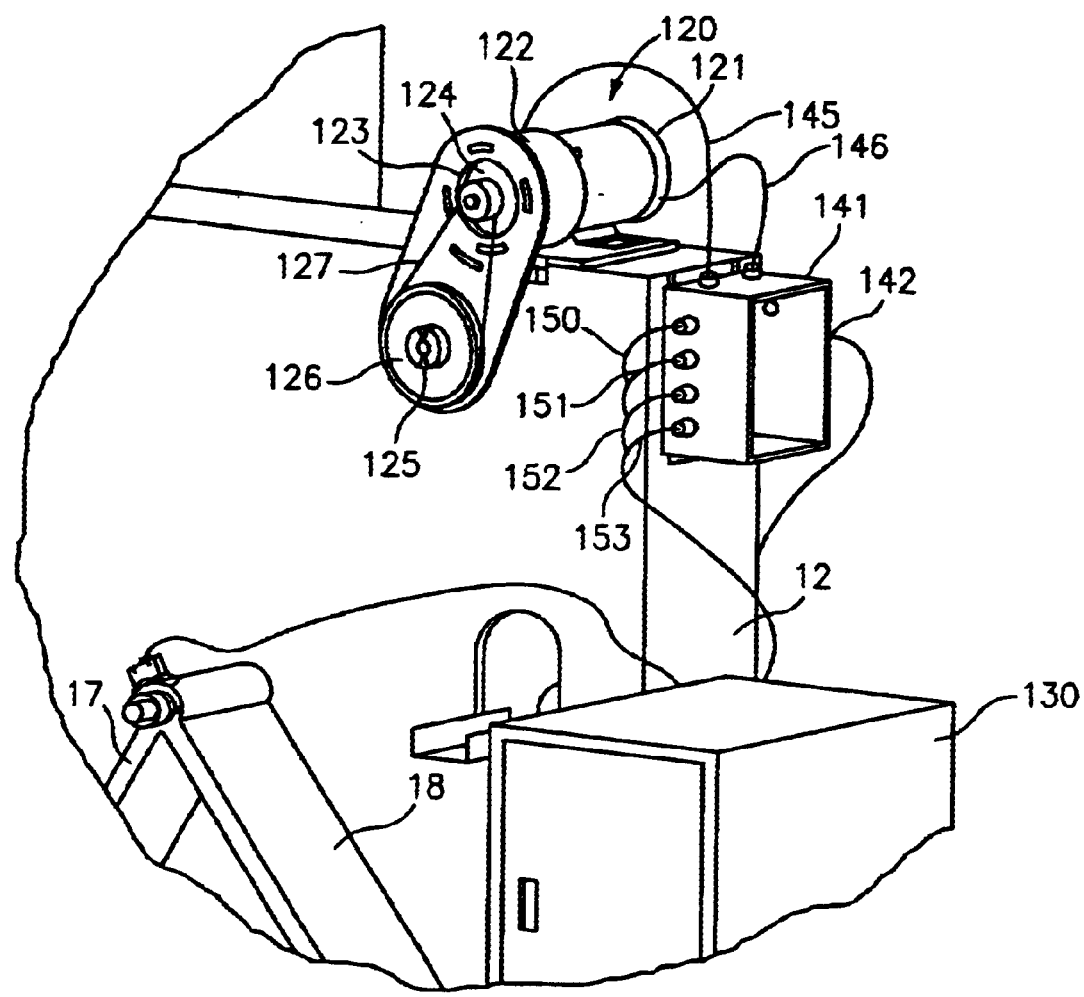
FIG. 2 is an enlarged, break-away view of a portion of the conversion kit of the present invention as mounted on the spring-actuated pitching machine.

FIG. 1 illustrates, in general terms, a setup in which the conversion kit of the present invention, referred to generally by reference numeral 10, is mounted in conjunction with a conventional spring-actuated commercial baseball pitching machine referred to generally by reference numeral 12. Pitching machine 12 is preferably an Iron Mike machine manufactured by Master Pitching Machine, Inc. of Kansas City, Mo. and includes a rotating arm 13, ball delivery mechanism 14 for delivering a ball 15 to the rotating arm 13 to be thrown toward a batter (not shown) and a first cam 16 and first cam switch (not shown) on the arm extensions 17 and 18 on the opposite side of the pitching machine (see FIG. 2 and FIG. 2A) for controlling the number of rotations of the rotating arm 13.

The conversion kit 10 includes a projection screen 100, video projector 110, a clutch motor unit 120; a control unit 130, and a relay unit 140.

The projection screen 100 includes a hole or aperture 102 in the screen in alignment with the pitching machine 12 to permit a ball thrown by the pitching machine 12 to travel through the screen toward a batter. The projection screen 100 includes a fabric screen mounted on a steel projector frame (not shown) to provide the requisite support for the fabric screen. The actual projection screen 100 is fabricated from a white fabric capable of absorbing the impact of a baseball thrown or hit into the screen and are typically mounted on the projector frame using a shock absorbing connector such as, for example, bungee cords, to reduce the rebound effect should a batted ball hit the screen.

The video projector 110 can be virtually any video projector but is, preferably, an LCD projector of the type manufactured and marketed by such projection companies as Mitsubishi, Hitachi, Proxima and others. The video projector 110 is adapted to project a video image of an actual pitcher onto the projection screen, the showing of which is fully timed and synchronized with the release of a ball by the pitching machine 10 through the aperture 102 in the screen 100.

Clutch motor unit 120 includes a motor 121, preferably a ⅓ horsepower, c-faced, foot mounted, Baldor AC motor which is mounted on the top of the frame of the pitching machine 12. A brake clutch 122, preferably a Warner brake clutch, is mounted to the front of the motor 121. The output shaft 123 of the brake clutch is a timing pulley 124. An original drive shaft 125 on the pitching machine 12 includes a second timing pulley 126 and a timing belt 127 connects the two pulleys 124 and 126.

Figure 2A:
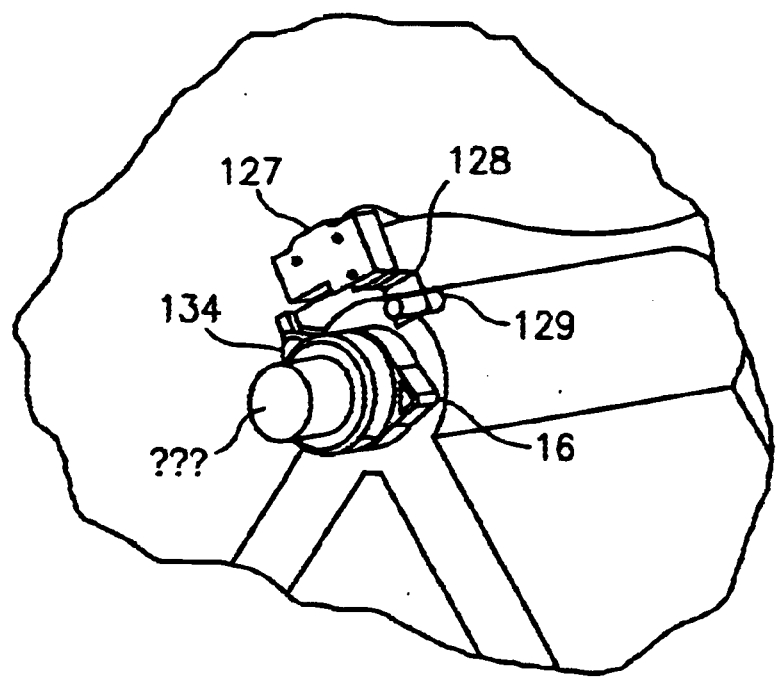
FIG. 2A is an exploded perspective view of a portion of the spring-actuated pitching machine on which an additional cam and switch are provided.

As shown in greater detail in FIG. 2A, the conversion kit of the present invention includes a second cam switch 127, preferably an Omron limit switch, is mounted on mounting bracket 128 which is connected to studs 129 welded to arm extensions 16, 17 and a second cam 134 which is mounted onto the main arm shaft 20 of the pitching machine 12 extends through an aperture in the arm extensions 16, 17. Second cam switch 127 is connected to the relay box by connector 152.

Figure 4:
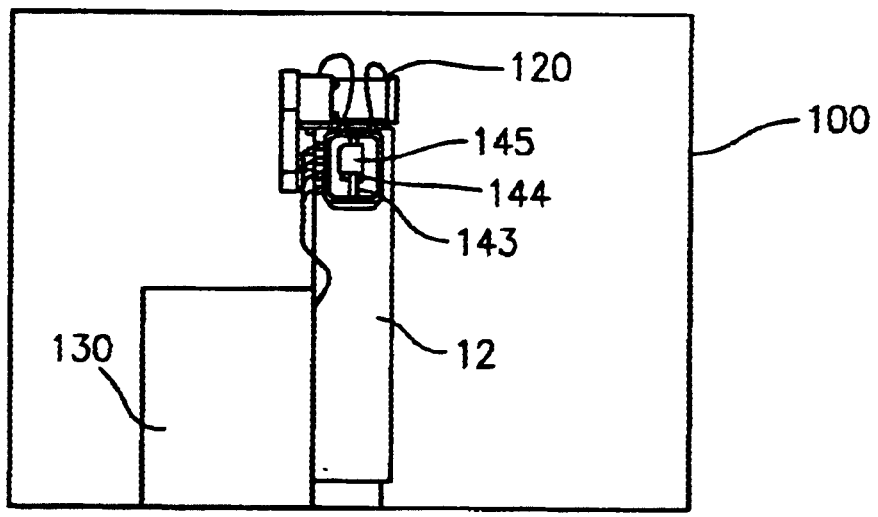
FIG. 4 is a rear view of the spring-actuated pitching machine of FIG. 1 including the conversion kit of the present invention.

Relay unit 140 includes a relay control box 142 which is mounted on the back of the frame of the pitching machine 12 which includes first and second relays 143, 144, respectively (See FIG. 4) and a clutch brake control module 145. First and second relays 143, 144, respectively, are connected to the motor 121 and the clutch brake 122 of the clutch motor unit 120 by connectors 145 and 146, respectively, which permit them to turn on and off the clutch brake 122. The relays 143 and 144 are preferably Dayton 120 v, 12 amp double pull, double throw relays. The first relay 143 turns on the brake clutch 122 so as to engage and actuate the brake clutch 122 while the second relay 144 serves to override the first relay 143. When it is necessary for the pitching machine 12 to throw a ball 15, the first relay 143 turns the brake clutch 122 back on.

Relay unit 140 is further connected to the control unit 130 by a plurality of connectors 150, 151, 152 and 153.

The control unit 130 is a standard Windows based personal computer which includes at least two parallel ports, a microprocessor and operating software capable of multitasking, a hard drive preferably having at least 10

Gigabytes of storage space, a video card and a control card. It includes an interface box that connects to one of the parallel ports on the personal computer and has inputs for the motors for the pitching machine 12 and coin inputs and outputs for the coin operating unit (not shown). The control unit 130 is in communication with the relay unit 140 and the video projector 110.

Figure 5:
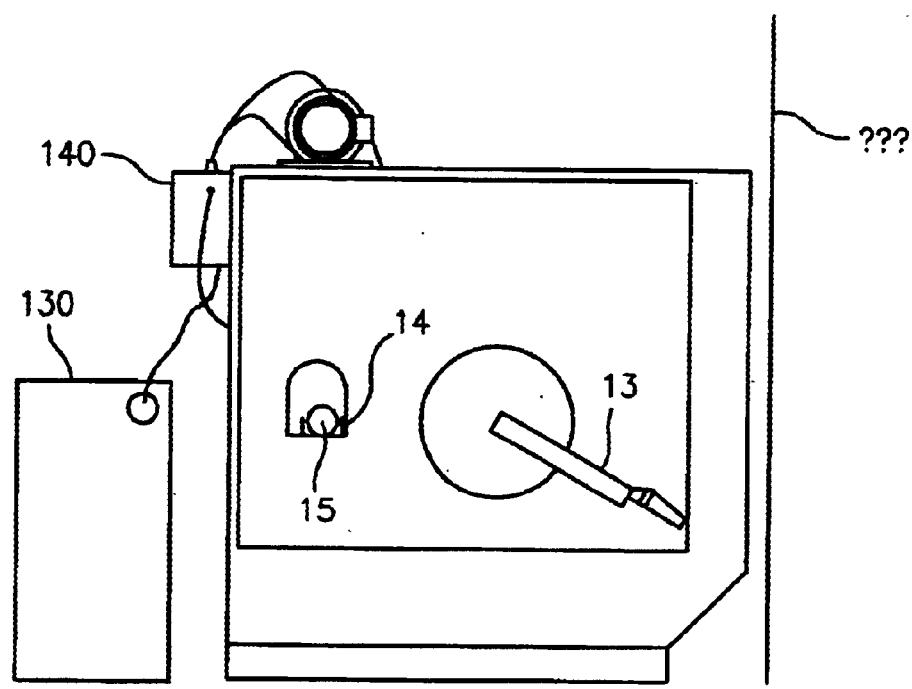
FIG. 5 is a side view of the pitching machine of FIG. 1 including the conversion kit of the present invention in a rest position.
Figure 6:
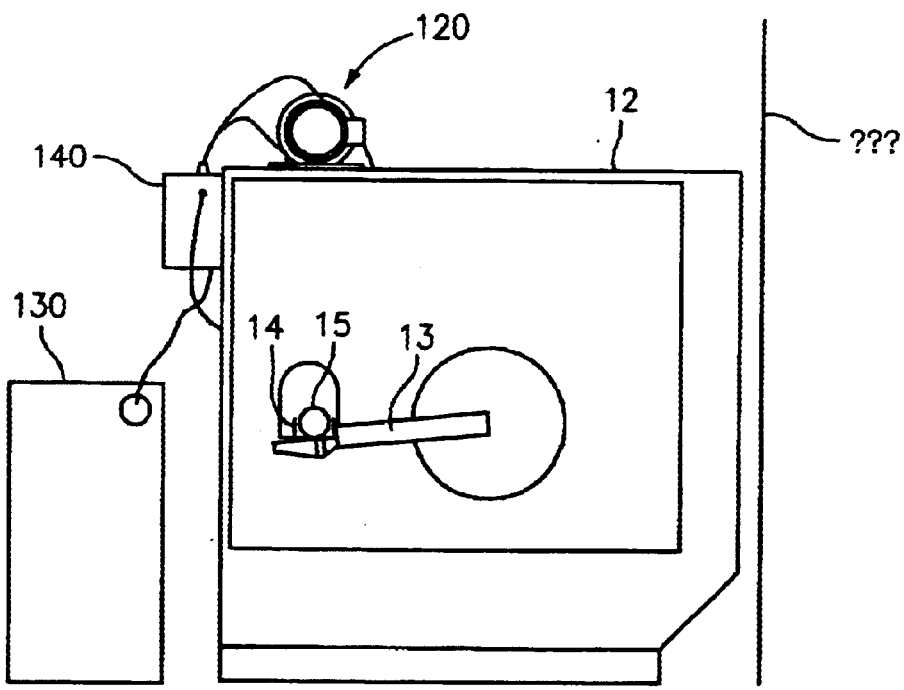
FIG. 6 is a side view of the pitching machine of FIG. 1 including the conversion kit of the present invention in a cocked or queued position.
Figure 7:
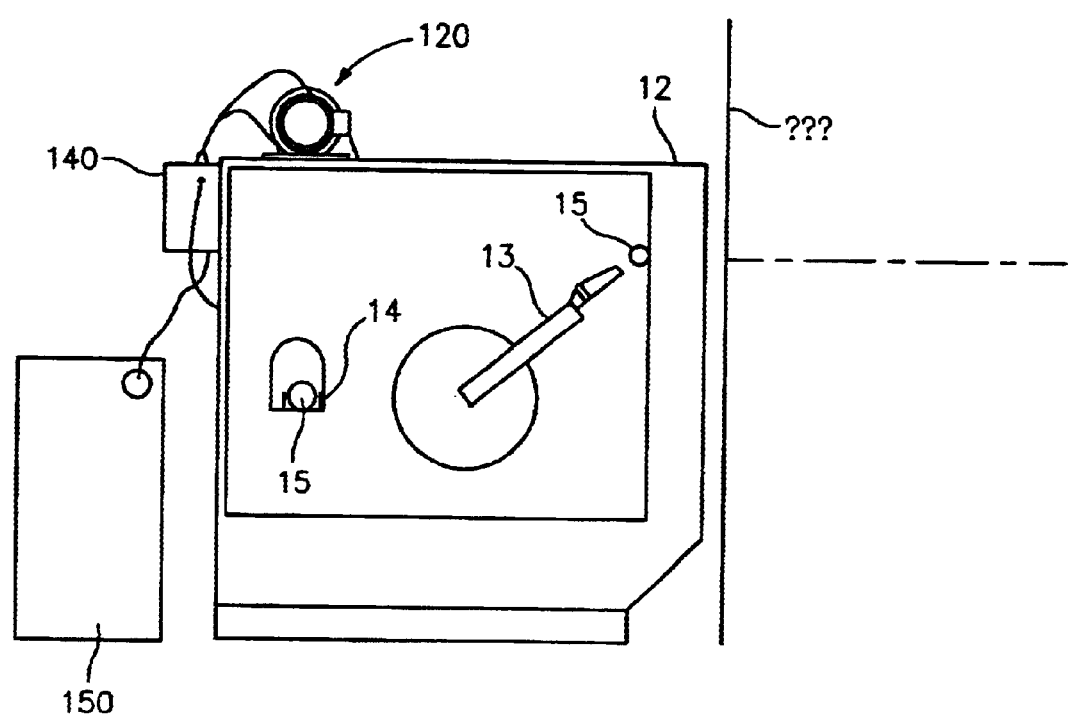
FIG. 7 is a side view of the pitching machine of FIG. 1 including the conversion kit of the present invention in a firing position.

In operation, a user drops a coin into the coin operating unit (not show) which turns on the spring-actuated pitching machine. As shown in FIGS. 5–7, the arm 13 of the pitching 12 moves from its at rest position (FIG. 5) to a cocked or queued position (FIG. 6) where it picks up a ball 15. The arm 13 stops at this queued position as a result of the actuation of the second cam switch 127 which sends a signal to the control unit 130 to cause both the arm to stop and the video to commence. The length of the video is a known. At a predetermined time, the second relay 144 is fired which overrides the first relay 143 which causes the drive motor on the pitching machine (not shown) to re-engage and release the arm 13 and fire the ball toward the batter through the screen as shown in FIG. 7. Elapsed time is defined by the formula:

Time=Frame Rate (frames/sec)×Number of Elapsed Frames

Due to the spring action of the arm, the arm continues its rotation and the ball is released. By carefully controlling the elapsed time as counted by Windows Media Player, the ball is propelled in synchronization with the video.

The control unit 130 is able to display a variety of different images onto the projection screen 100 by sending such images to the projector 110. Such images may include, for example, images of different pitchers, advertising messages, and the like.

Having thus described the invention with particular reference to the preferred forms thereof, it will be obvious that various changes and modifications can be made therein without departing from the spirit and scope of the present invention as defined by the appended claims.

We claim:

1. A conversion kit for converting a pitching machine of the type having a spring actuated arm for propelling a ball toward a hitter into a video pitching machine, said kit including:
   a projection screen adapted to be positioned between said pitching machine and a batter,
   a video projector for projecting the video image of an actual pitcher on said screen; and
   a clutch motor unit for holding said spring actuated arm in a queued position while the video image of the pitcher is being displayed on the screen and for releasing said arm at a predetermined time so as to deliver a ball toward a hitter in synchronization with the video image.

2. The conversion kit of claim 1, further including control means for controlling said clutch motor unit.

3. The conversion kit of claim 2, wherein said control means are connected to said video projector and said clutch motor unit and includes means for storing and playing the video image for projection by the video projector.

4. The conversion kit of claim 3, wherein said control unit includes a microprocessor and a hard drive on which said video images are stored.

5. The conversion kit of claim 4, wherein said control unit is able to cause the projector to display the video image on the screen and actuate the clutch motor unit to release the arm and cause the ball to be propelled toward a hitter in synchronization with the video image.

6. The conversion kit of claim 4, wherein said kit further includes a first and second relay.

7. The conversion kit of claim 6, wherein said first relay serves to turn on the clutch motor unit to retain the arm in a queued position and the second relay serves to override the first relay and permit the arm to propel the ball toward the hitter.

8. The conversion kit of claim 1, wherein said screen includes an aperture to permit a ball delivered by said pitching machine to pass there-through.

9. The conversion kit of claim 1, wherein said video projector is an LCD projector.

10. A The conversion kit of claim 1, wherein said projector screen is a fabric screen shock mounted to a rigid frame.

11. A conversion kit for converting a pitching machine of the type having a spring actuated arm for propelling a ball toward a hitter into a video pitching machine, said kit including:
    a projection screen adapted to be positioned between said pitching machine and a batter,
    a video projector for projecting the video image of an actual pitcher on said screen;
    a clutch motor unit having a clutch brake for holding the arm in a queued position while the video image of the pitcher is being displayed on the screen and for releasing said clutch brake at a predetermined time so as to synchronize the release of the ball with the video image; and
    a relay unit including a first relay for causing said arm to be held in a queued position and a second relay for releasing said arm from the queued position and deliver a ball toward the batter.

12. A method for converting a pitching machine of the type having a spring actuated arm for propelling a ball toward a hitter into a video pitching machine, said method comprising the steps of:
    providing a conversion kit including:
        a projection screen adapted to be positioned between said pitching machine and a batter,
        a video projector for projecting the video image of an actual pitcher on said screen;
        a clutch motor unit including a clutch brake for holding the arm in a queued position while the video image of the pitcher is being displayed on the screen and for releasing said clutch brake at a predetermined time so as to synchronize the release of the ball with the video image; and
        a relay unit including a first relay for causing said arm to be held in a queued position and a second relay for releasing said arm from the queued position and deliver a ball toward the batter; and
    installing said conversion kit onto a spring-actuated pitching machine.

* * * * *